United States Patent
Bert

(10) Patent No.: US 8,732,396 B2
(45) Date of Patent: May 20, 2014

(54) METHOD AND APPARATUS FOR PROTECTING THE INTEGRITY OF CACHED DATA IN A DIRECT-ATTACHED STORAGE (DAS) SYSTEM

(75) Inventor: Luca Bert, Cumming, GA (US)

(73) Assignee: LSI Corporation, Milpitas, CA (US)

( * ) Notice: Subject to any disclaimer, the term of this patent is extended or adjusted under 35 U.S.C. 154(b) by 934 days.

(21) Appl. No.: 12/793,872

(22) Filed: Jun. 4, 2010

(65) Prior Publication Data

US 2010/0312960 A1     Dec. 9, 2010

Related U.S. Application Data

(60) Provisional application No. 61/268,055, filed on Jun. 8, 2009.

(51) Int. Cl.
*G06F 12/00* (2006.01)

(52) U.S. Cl.
USPC .............................. 711/114; 714/2

(58) Field of Classification Search
USPC .............................. 711/114; 714/2
See application file for complete search history.

(56) References Cited

U.S. PATENT DOCUMENTS

| | | |
|---|---|---|
| 5,640,506 A | 6/1997 | Duffy |
| 6,321,298 B1 | 11/2001 | Hubis |
| 6,574,709 B1 | 6/2003 | Skazinski et al. |
| 6,578,160 B1 | 6/2003 | MacHardy, Jr. et al. |
| 7,003,688 B1 | 2/2006 | Pittelkow et al. |
| 7,043,610 B2 | 5/2006 | Horn et al. |
| 7,076,606 B2 | 7/2006 | Orsley |
| 7,127,633 B1 | 10/2006 | Olson et al. |
| 7,181,581 B2 | 2/2007 | Burkey |
| 7,444,541 B2 | 10/2008 | Lubbers et al. |
| 7,610,446 B2 | 10/2009 | Kobayashi et al. |

*Primary Examiner* — Matthew Bradley
(74) *Attorney, Agent, or Firm* — Daniel J. Santos

(57) ABSTRACT

A DAS system that implements RAID technology is provided in which an array of solid state disks (SSDs) that is external to the DAS controllers of the DAS system is used by the DAS controllers as WB cache memory for performing WB caching operations. Using the external SSD array as WB cache memory allows the DAS system to be fully cache coherent without significantly increasing the complexity of the DAS system and without increasing the amount of bandwidth that is utilized for performing caching operations. In addition, using the external SSD array as WB cache memory obviates the need to mirror DAS controllers.

16 Claims, 9 Drawing Sheets

METHOD AND APPARATUS FOR PROTECTING THE INTEGRITY OF CACHED DATA IN A DIRECT-ATTACHED STORAGE (DAS) SYSTEM

CROSS-REFERENCE TO RELATED APPLICATIONS

This application claims priority to and the benefit of the filing date of a U.S. provisional patent application that was filed on Jun. 8, 2009, having Ser. No. 61/268,055, entitled "METHOD TO EFFICIENTLY USE SSD AS WB CACHE ELEMENT IN BOTH PRIVATE AND SHARED DAS CONFIGURATIONS", which is incorporated herein by reference in its entirety.

TECHNICAL FIELD OF THE INVENTION

The invention relates generally to data storage systems and, more particularly, to a method and apparatus for protecting the integrity of cached data in a direct-attached storage (DAS) system.

BACKGROUND OF THE INVENTION

A storage array or disk array is a data storage device that includes multiple magnetic hard disk drives (HDDs) or similar persistent storage units. A storage array can allow large amounts of data to be stored in an efficient manner. A server or workstation may be directly attached to the storage array such that the storage array is local to the server or workstation. In cases in which the server or workstation is directly attached to the storage array, the storage array is typically referred to as a direct-attached storage (DAS) system. Alternatively, a server or workstation may be remotely attached to the storage array via a storage array network (SAN). In SAN systems, although the storage array is not local to the server or workstation, the disk drives of the array appear to the operating system (OS) of the server or workstation to be locally attached.

DAS systems and SAN systems are often configured as Redundant Array of Inexpensive (or Independent) Disks (RAID) systems. RAID systems use storage redundancy in order to improve storage reliability and/or in order to improve input/output (I/O) performance. In general, RAID systems simultaneously use two or more magnetic HDDs, typically referred to as physical disk drives (PDs), to achieve greater levels of performance, reliability and/or larger data volume sizes. The phrase "RAID" is generally used to describe computer data storage schemes that divide and replicate data among multiple PDs. In RAID systems, one or more PDs are set up as a RAID virtual disk drive (VD). In a RAID VD, data might be distributed across multiple PDs, but the VD is seen by the user and by the OS of the server or workstation as a single disk.

In a DAS system that is configured as a RAID system, the DAS controller functions as a RAID controller. In such a system, the RAID controller uses a portion of its local memory as cache memory. The cache memory is used for temporarily storing data that is to be written to the PDs. One type of cache memory configuration that is used for this purpose is known as a write back (WB) cache memory configuration. In WB cache memory configurations, cache commands are typically completed as soon as the data is moved into cache memory. In such configurations, maintaining the integrity of the cached data can be a challenge in the event that a failover or failback event occurs due to the fact that the data, once cached, is committed to being written to the PDs. Consequently, steps should be taken to ensure that the occurrence of a failover or failback event does not result in the cached data becoming corrupted. Stated another way, the DAS system should provide cache coherency. In order to provide cache coherency, the cached data is typically duplicated in another memory device, as will now be described with reference to FIGS. 1-3.

FIG. 1 illustrates a block diagram of a typical DAS system 2 that implements RAID technology. The system 2 includes a server 3, a RAID controller 4, and a peripheral interconnect (PCI) bus 5. The RAID controller 4 includes a central processing unit (CPU) 6, a memory device 7, and an I/O interface device 8. A portion of the storage space of memory device 7 is used as cache memory. Alternatively, the RAID controller 4 may include a separate memory device (not shown) for use as cache memory. The I/O interface device 8 is configured to perform data transfer in compliance with known data transfer protocol standards, such as the Serial Attached SCSI (SAS) and/or the Serial Advanced Technology Attachment (SATA) standards. The I/O interface device 8 controls the transfer of data to and from multiple PDs 9. The RAID controller communicates via the PCI bus 5 with a server CPU 11 and a server memory device 12. The server memory device 12 stores software programs for execution by the server CPU 11 and data.

During a typical write action, the server CPU 11 sends write request instructions via the PCI bus 5 to the RAID controller 4. The CPU 6 of the RAID controller 4 causes the data to be temporarily stored in cache memory in the memory device 7 of the RAID controller 4. The data is subsequently transferred from the memory device 7 via the I/O interface device 8 to one or more of the PDs 9. The memory device 7 contains the core logic for performing the mapping between virtual addresses of the RAID VD and physical addresses of the PDs 9. The CPU 6 of the RAID controller 4 performs calculations in accordance with the RAID level of the system 2, such as parity calculations. In the event that the current RAID level of the system 2 uses parity, the I/O interface device 8 causes the parity bits to be stored in one or more of the PDs 9.

During a typical read operation, the server CPU 11 sends a corresponding read request to the RAID controller 4 via the PCI bus 5. The RAID controller CPU 6, with use of the logic held in memory device 7, processes the request and, if the requested data is held in cache memory in the memory device 7, retrieves the requested data from cache memory of the memory device 7. If the requested data is not held in cache memory in the memory device 7, the RAID controller CPU 6 causes the requested data to be retrieved from the PDs 9. The retrieved data is transferred over the PCI bus 5 to the server CPU 11 to satisfy the read request.

FIG. 2 illustrates a block diagram of a known shared DAS system 23 that includes multiple of the RAID controllers 4 shown in FIG. 1 and the array of PDs 9 shown in FIG. 1, which are shared by the RAID controllers 4. In order to provide cache coherency in the shared DAS system 23, the data that is cached in the memory device 7 of one of the RAID controllers 4 is replicated, or mirrored, in the memory device 7 of one of the other RAID controllers 4 such that RAID controllers 4 are paired in terms of cache mirroring. Replication of the cached data is represented in FIG. 2 by arrows 24. While this type of cache coherency technique is generally effective, if a failover or failback event occurs in both RAID controllers 4 of a given pair, the integrity of the cached data for that mirrored pair is compromised.

FIG. 3 illustrates a block diagram of shared DAS system 23 shown in FIG. 2 in which cache coherency is provided by replicating the data cached in the memory device 7 of each of the RAID controllers 4 in the memory devices 7 of each of the other RAID controllers 4. Replication of the cached data is represented in FIG. 3 by arrows 24 and 25. While this type of cache coherency technique is generally effective, the physical implementation of such a technique is extremely complex and utilizes a large amount of bandwidth. In addition, as the system 23 is scaled out and larger numbers of RAID controllers 4 are added to the system 23, the complexity of the system 23 and the amount of bandwidth that is utilized for cache mirroring increase exponentially. For these reasons, this cache coherency solution is impractical in most cases.

Another solution to the cache coherency problem in a DAS system is to use a WT cache configuration instead of a WB cache configuration. However, using a WT cache configuration instead of a WB cache configuration generally degrades the I/O performance of the DAS system, and therefore is an unsuitable for many storage applications in a competitive market. While the cache coherency problem can easily be dealt with using SAN controllers, such a solution is relatively expensive, and in many cases, prohibitively expensive to implement.

Accordingly, a need exists for a DAS system that adequately protects the integrity of cached data and that overcomes the above-described limitations of known cache coherency solutions used in DAS systems.

SUMMARY OF THE INVENTION

The invention provides a DAS system, method and computer-readable medium for protecting the integrity of cached data. The DAS system comprises a plurality of magnetic HDDs configured as a RAID array of PDs, an array of solid state disks (SSDs) configured as cache memory, and at least first and second DAS controllers connected to the RAID array of PDs and to the SSD array. Each DAS controller has a CPU, a local memory device, and an I/O interface device. Each of the CPUs and each of the local memory devices is configured to perform a RAID level of technology consistent with the RAID configuration of the RAID array of PDs. Each of the CPUs is configured to perform a caching algorithm that causes data received in the respective DAS controller to be temporarily stored in the cache memory of the SSD array and subsequently stored in one or more of the PDs of the RAID array of PDs.

The method for protecting the integrity of cached data in a DAS system comprises the following: in a first DAS controller, receiving data; in the CPU of the first DAS controller, performing a caching algorithm that causes the data received in the first DAS controller to be temporarily stored in one or more SSDs of an SSD array and subsequently stored in one or more magnetic HDDs configured as a RAID array of PDs; in a second DAS controller, receiving data; and in the CPU of the second DAS controller, performing a caching algorithm that causes the data received in the second DAS controller to be temporarily stored in one or more SSDs of the SSD array and subsequently stored in one or more of the magnetic HDDs configured as the RAID array of PDs.

The computer-readable medium comprises a first set of instructions and a second set of instructions for execution by a DAS controller. The first set of instructions receives data in the DAS controller. The second set of instructions performs a caching algorithm in the first DAS controller that causes the data received in the first DAS controller to be temporarily stored in one or more SSDs of an SSD array and subsequently stored in one or more magnetic HDDs configured as a RAID array of PDs.

These and other features and advantages of the invention will become apparent from the following description, drawings and claims.

DETAILED DESCRIPTION OF ILLUSTRATIVE EMBODIMENTS

Figure 1:
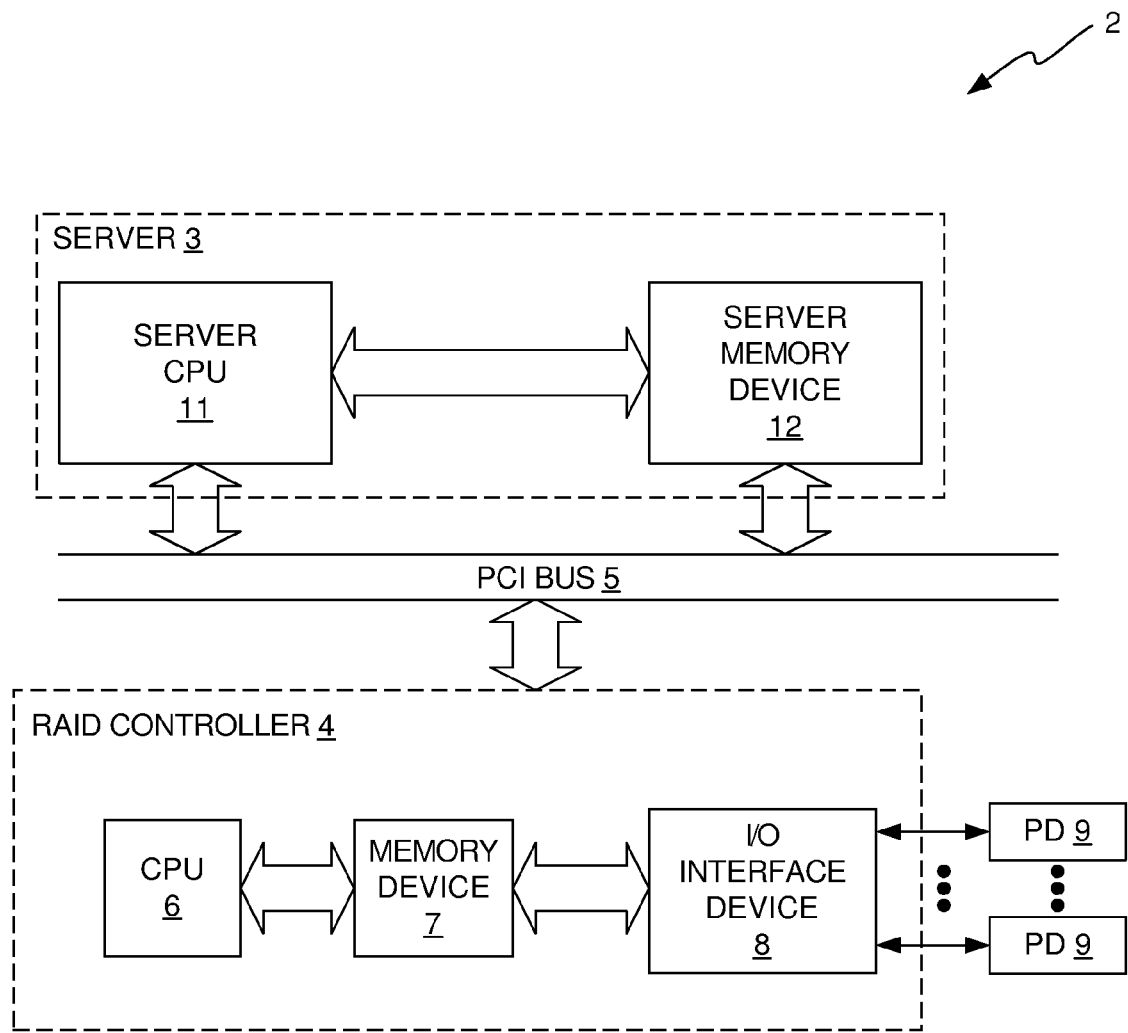
FIG. 1 illustrates a block diagram of a known DAS system that implements RAID technology.
Figure 2:
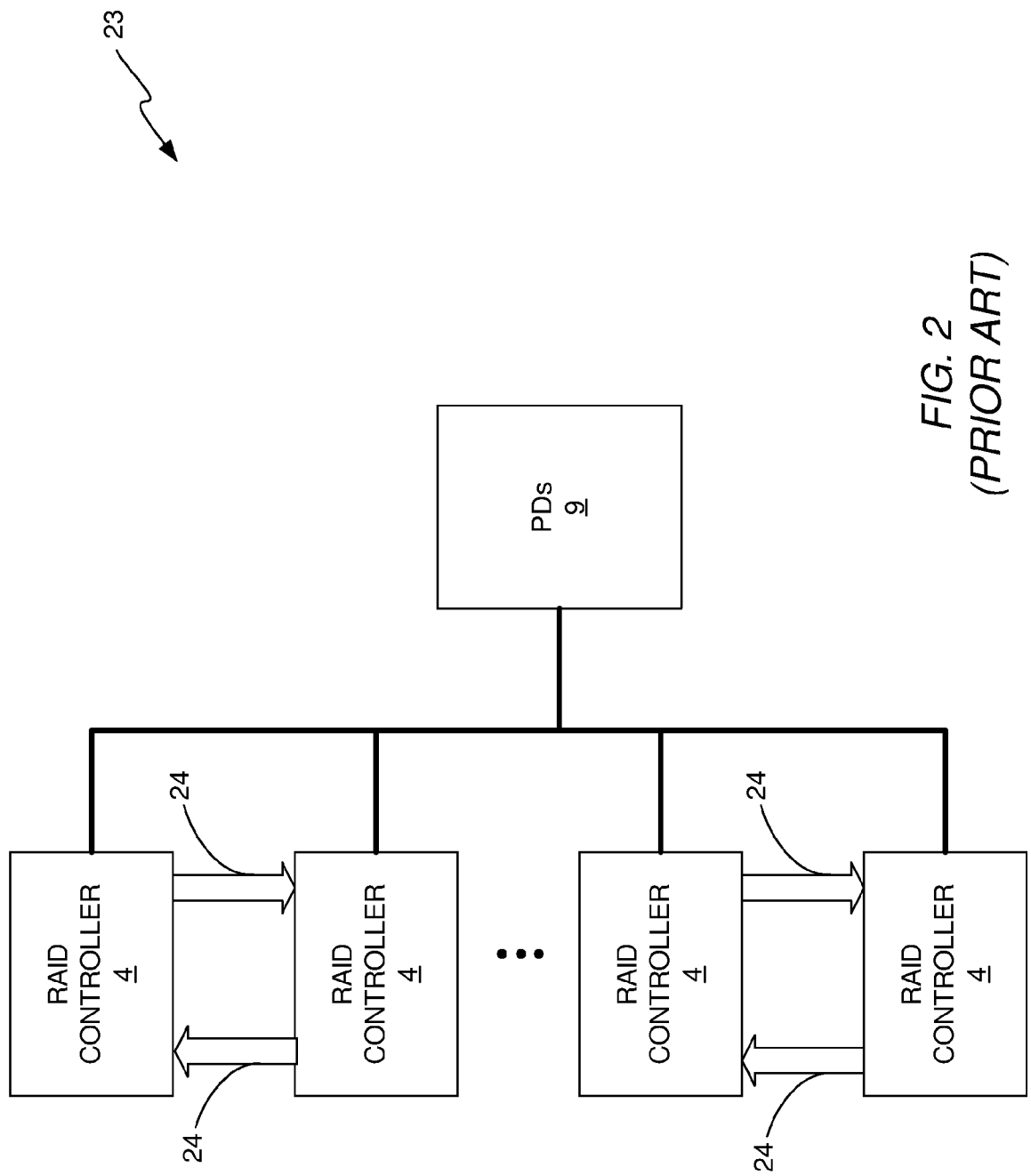
FIG. 2 illustrates a block diagram of a shared DAS system in which a plurality of the RAID controllers shown in FIG. 1 share the array of PDs shown in FIG. 1, and in which cache coherency is provided by mirroring cached data in the memory devices of pairs of the RAID controllers.
Figure 3:
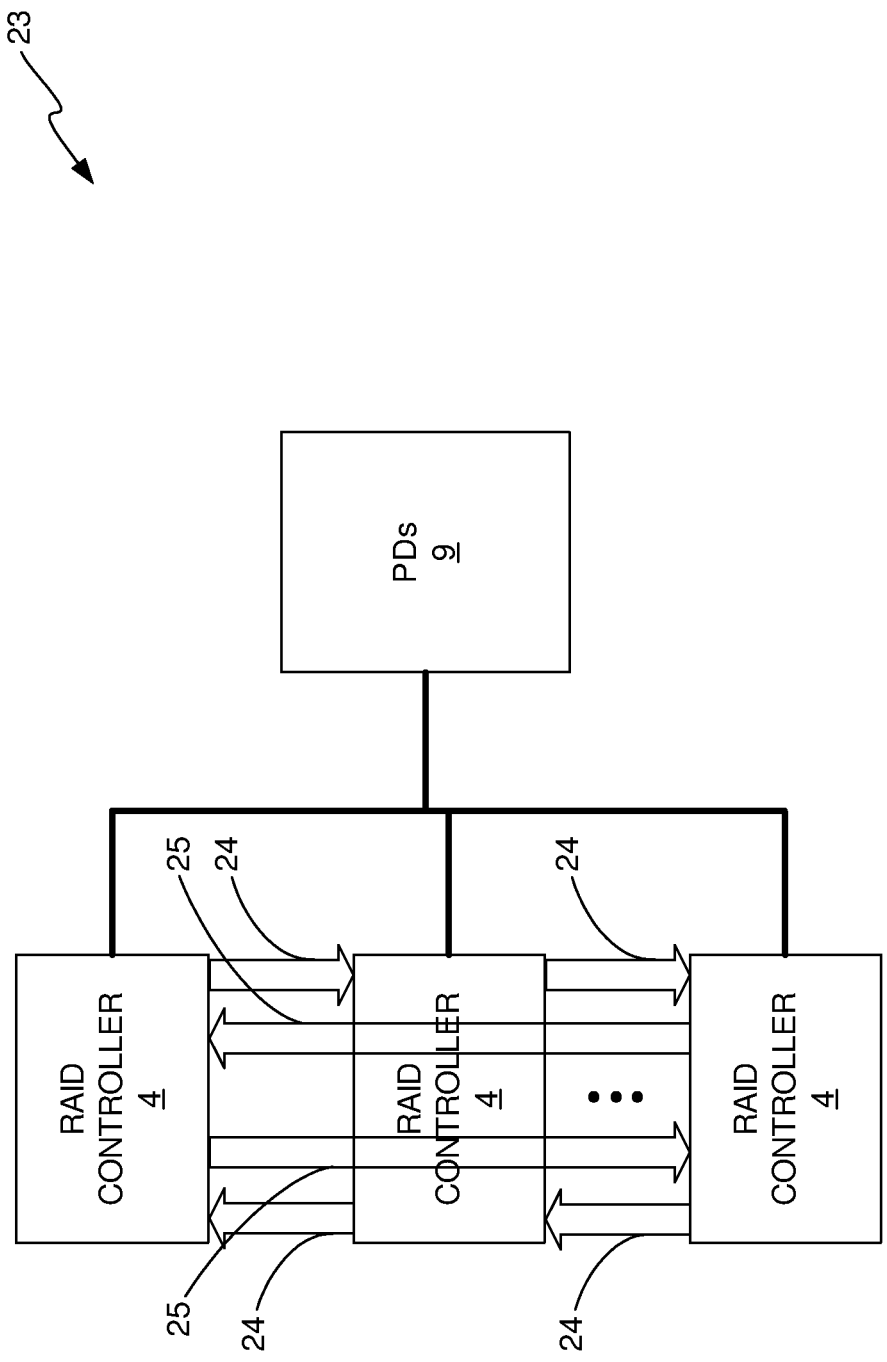
FIG. 3 illustrates a block diagram of the shared DAS system shown in FIG. 2 in which cache coherency is provided by mirroring cached data of each RAID controller in the memory devices of all of the other RAID controllers.

In accordance with the invention, a DAS system that implements RAID technology is provided in which an array of solid state disks (SSDs) that is external to the DAS controllers of the DAS system is used by the DAS controllers as WB cache memory for performing WB caching operations. Using the external SSD array as WB cache memory allows the DAS system to be fully cache coherent without significantly increasing the complexity of the DAS system and without increasing the amount of bandwidth that is utilized for performing caching operations. In addition, using the external SSD array as WB cache memory obviates the need to mirror DAS controllers in the manner described above with reference to FIGS. 1-3.

Figure 4:
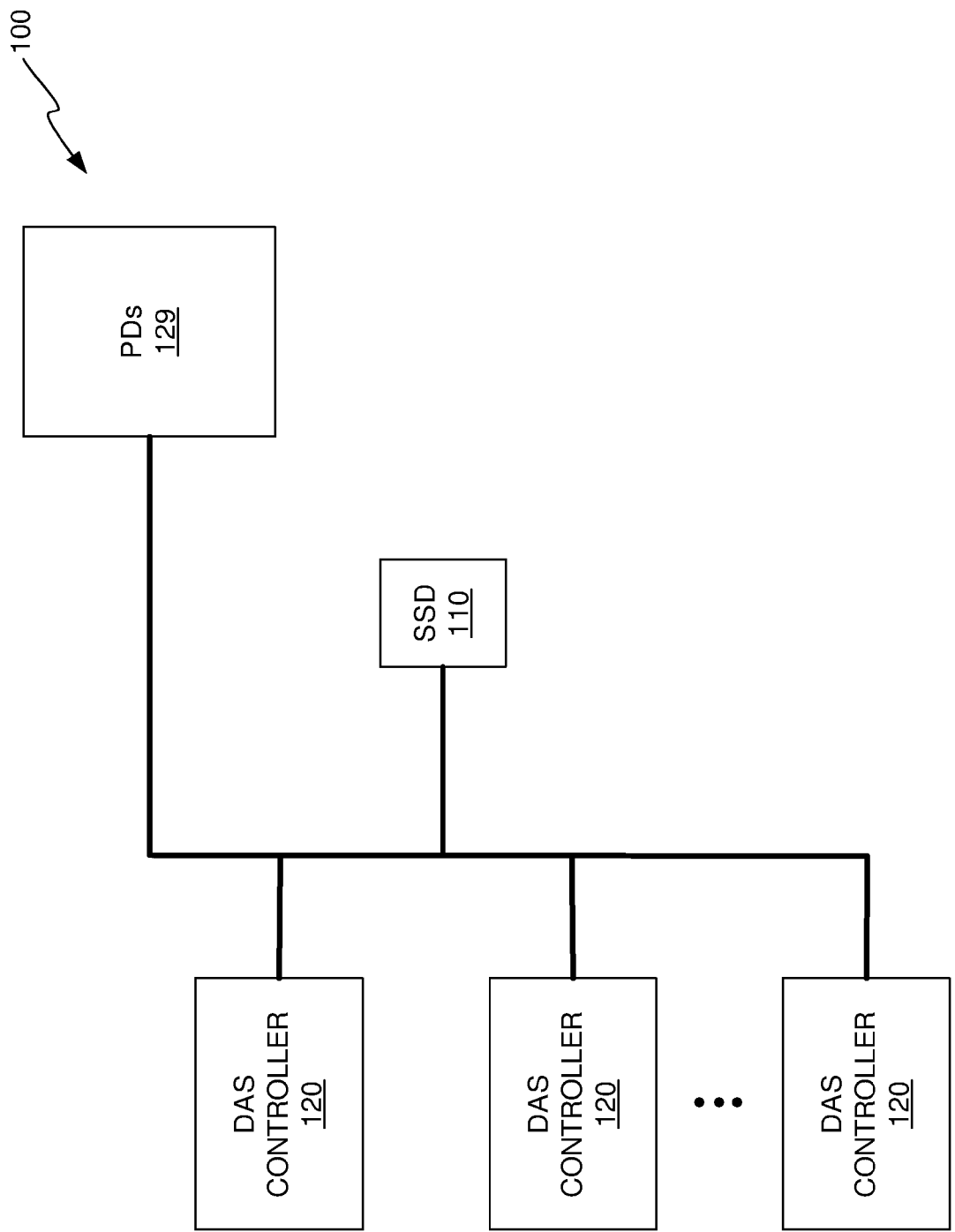
FIG. 4 illustrates a block diagram of a shared DAS system in accordance with an embodiment in which at least one shared solid state disk (SSD) that is external to the DAS controllers of the DAS system is used as WB cache memory for caching data to be written to the PDs of the DAS system.
Figure 5:
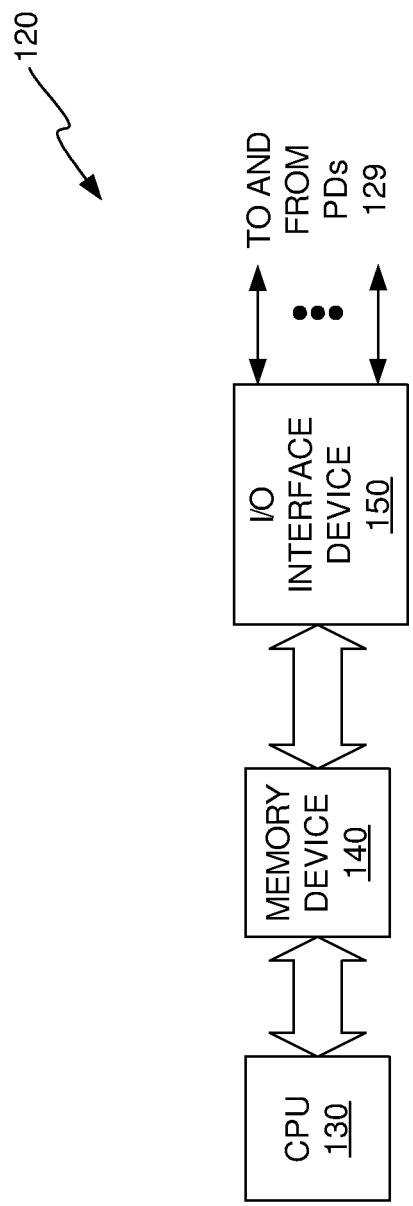
FIG. 5 illustrates a block diagram of one of the DAS controllers shown in FIG. 4.

FIG. 4 illustrates a block diagram of the DAS system 100 of the invention in accordance with an illustrative embodiment in which an SSD array 110 of the DAS system 100 is shared by a plurality of DAS controllers 120 of the DAS system 100 as WB cache memory. FIG. 5 illustrates a block diagram of one of the DAS controllers 120 shown in FIG. 4. The DAS controllers 120 of the DAS system 100 have identical or similar configurations to that of the RAID controller 4 shown in FIG. 1. Each of the DAS controllers 120 operates in the same manner in which the RAID controller 4 operates, except with respect to caching operations. Thus, as is the case for the RAID controller 4 shown in FIG. 1, each of the DAS controllers 120 shown in FIG. 4 is configured as a RAID controller. The DAS system 100 employs RAID technology. The invention is not limited with respect to the level of RAID that is employed in the DAS system 100.

RAID has seven basic levels corresponding to different system designs, and any one or more of those levels may be implemented in the DAS system 100. A brief discussion of the different RAID levels will now be provided, even though these RAID levels are well known in the art. The seven basic RAID levels, typically referred to as RAID levels 0-6, are as follows. RAID level 0 uses striping to achieve improved data reliability and increased I/O performance. The term "striping" means that logically sequential data, such as a single data file, is fragmented and assigned to multiple PDs in a round-robin fashion. Thus, the data is said to be "striped" over multiple PDs when the data is written. Striping improves performance and provides additional storage capacity. RAID level 1 uses mirroring without parity. The term "mirroring" means that data is replicated on separate PDs in real time to ensure that the data is continuously available. This type of replication provides data redundancy. RAID level 2 uses redundancy and striping. In RAID level 2, redundancy is achieved through the use of Hamming codes, which are calculated across bits on PDs and stored on multiple PDs. If a PD fails, the parity bits can be used to reconstruct the data.

RAID level 3 systems use byte-level striping in combination with interleaved parity bits and a dedicated parity PD. The use of byte-level striping and redundancy results in improved performance and provides the system with fault tolerance. A RAID level 3 system can continue to operate without parity and no performance penalty is suffered in the event that the parity PD fails. RAID level 4 is essentially identical to RAID level 3 except that RAID level 4 systems employ block-level striping instead of byte-level or word-level striping. Because each stripe is relatively large, a single file can be stored in a block. Each PD operates independently and many different I/O requests can be handled in parallel. Error detection is achieved by using block-level parity bit interleaving. The interleaved parity bits are stored in a separate single parity PD.

RAID level 5 uses striping in combination with distributed parity. In order to implement distributed parity, all but one of the PDs must be present for the system to operate. Failure of any one of the PDs necessitates replacement of the PD. However, failure of a single one of the PDs does not cause the system to fail. RAID level 6 uses striping in combination with dual distributed parity. RAID level 6 systems require the use of at least four PDs, with two of the PDs being used for storing the distributed parity bits. The system can continue to operate even if two PDs fail. Dual parity becomes increasingly important in systems in which each VD is made up of a large number of PDs. RAID level systems that use single parity are vulnerable to data loss until the failed drive is rebuilt. In RAID level 6 systems, the use of dual parity allows a VD having a failed PD to be rebuilt without risking loss of data in the event that a PD of one of the other VDs fails before completion of the rebuild of the first failed PD.

With reference again to FIG. 5, the DAS controller 120 includes a CPU 130, a memory device 140, and an I/O interface device 150. The I/O interface device 150 controls the transfer of data to and from the PDs 129. The I/O interface device 150 is typically configured to perform data transfer in compliance with known data transfer protocol standards, such as the SAS and/or the SATA standards and variations thereof, for example, although other known data transfer protocols as well as proprietary data transfer protocols may be used for this purpose.

The operations of the DAS system 100 will now be described with reference to FIGS. 4 and 5. During a typical write operation, the CPU 130 of the DAS controller 120 receives data from an external server or workstation (not shown) that is to be written to one or more of the PDs 129. The DAS controller CPU 130 uses the SSD array 110 as WB cache memory to temporarily store the data to be written to the PDs 129. The process of WB caching the data in the SSD 110 is described below in more detail with reference to FIG. 6. At some point in time after the data has been WB cached in the SSD 110, the DAS controller CPU 130 causes the cached data to be transferred from the SSD 110 and stored in one or more of the PDs 129. The memory device 140 contains the core logic for performing the mapping between virtual addresses of the RAID VD and physical addresses of the PDs 129. The DAS controller 120 causes the cached data to be stored at the corresponding physical addresses in the PDs 129. The DAS controller CPU 130 also performs calculations in accordance with the RAID level of the DAS system 100, such as parity calculations. For example, if the RAID level of the DAS system 100 uses parity, the DAS controller CPU 130 calculates the parity bits and the I/O interface device 150 causes the parity bits to be stored in one or more of the PDs 129.

During a typical read operation, the DAS controller CPU 130 receives a read request from the external server or workstation (not shown) and, with use of the logic held in memory device 140, processes the read request to determine the physical addresses of one or more of the PDs 129 from which the data is to be read. The DAS controller CPU 130 then causes the requested data to be retrieved from the addresses at which the data resides in the PDs 129 and sent to the external server or workstation (not shown). A portion of the memory device 140 or some other memory device (not shown) within the DAS controller 120 may be used as read cache memory, in which case the CPU 130 will read the data from read cache memory instead of from the PDs 129 if the CPU 130 determines that the requested data is held in read cache memory.

Figure 6:
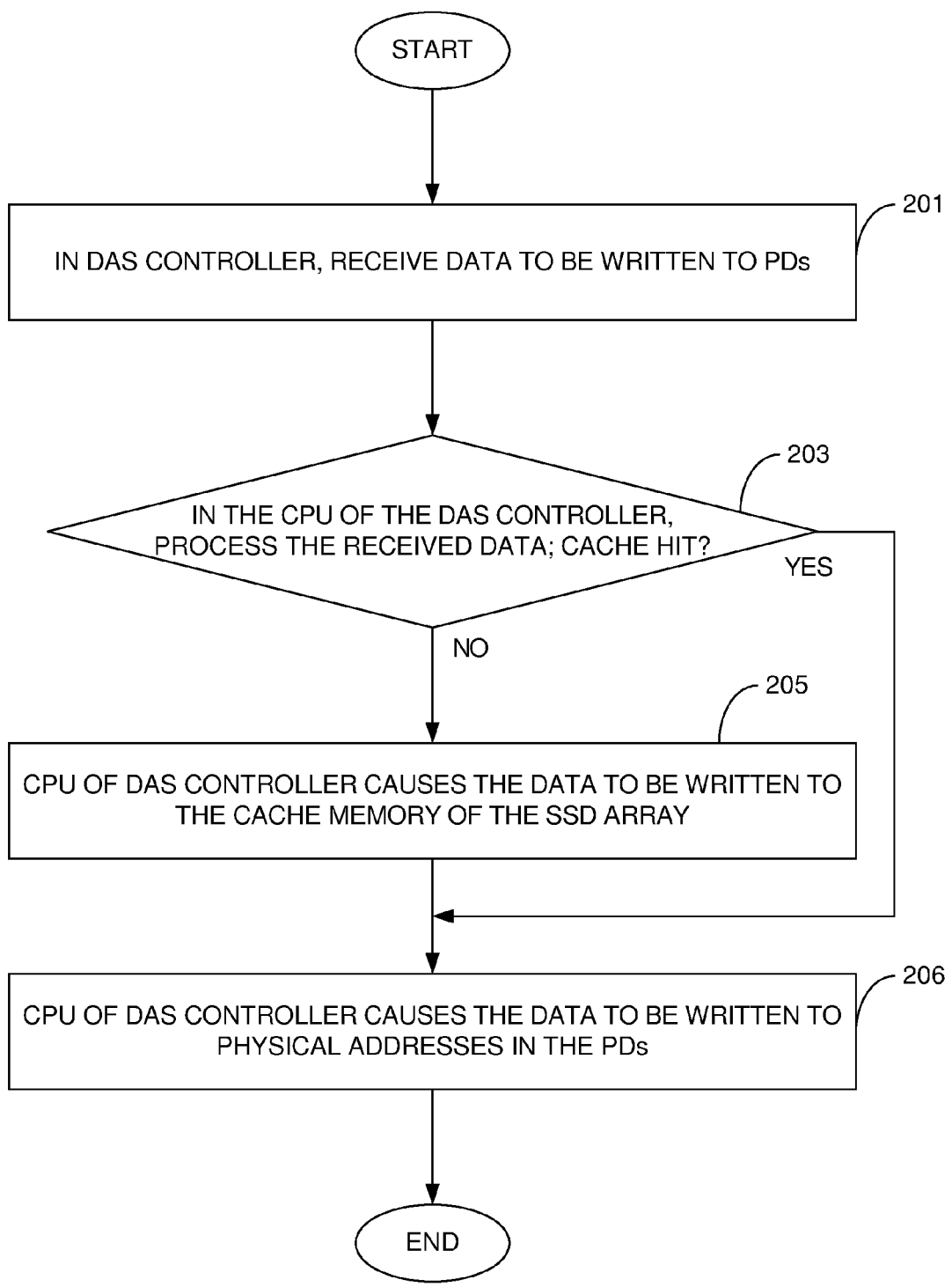
FIG. 6 illustrates a flowchart that represents the WB caching algorithm performed by the CPU of one of the DAS controllers shown in FIG. 4 in accordance with an illustrative embodiment.

FIG. 6 illustrates a flowchart that represents the WB caching algorithm performed by the CPU 130 of one of the DAS controllers 120 in accordance with an illustrative embodiment. The CPUs 130 of each of the DAS controllers 120 perform the WB caching algorithm. In the interest of brevity, however, the algorithm will only be described with reference to one of the DAS controllers 120. When a server or workstation (not shown) sends data to the DAS controller 120 to be written to the PDs 129, the DAS controller 120 receives the data, as indicated by block 201. The CPU 130 then processes the received data to determine whether a cache "hit" or a cache "miss" has occurred, as indicated by block 203. A cache "hit" means that the CPU 130 has determined that the data is currently held in cache memory in the SSD 110. A cache "miss" means that the CPU 130 has determined that the data is not currently held in cache memory.

If the CPU 130 determines that a cache miss has occurred, the CPU 130 causes the data to be written to the cache memory of the SSD array 110, as indicated by block 205. At some point in time after the data has been written to the cache memory of the SSD array 110, the CPU 130 causes the data to be stored in physical addresses in the PDs 129, as indicated by block 206. If, at block 203, the CPU 130 determines that a cache hit has occurred, the CPU 130 causes the corresponding data held in the cache memory of the SSD array 110 to be stored in corresponding physical addresses in the SSD array 110 at the step represented by block 206.

In contrast to the known cache coherency methods described above with reference to FIGS. 1-3, in accordance with the invention, cache coherency is provided by using some level of RAID technology for the SSD array 110. Specifically, when the DAS controllers 120 store data in cache memory in the SSD array 110, RAID technology is used to ensure that the data can be recovered in the event of failure of the SSD of the SSD array 110 in which the data is cached. For example, RAID level 0 may be used such that when each of the DAS controllers 120 stores data in cache memory in the SSD array 110, the data is striped across multiple SSDs of the SSD array 110. If, for example, RAID level 1 is used, then when each of the DAS controllers 120 stores data in cache memory in the SSD array 110, the data is replicated, or mirrored, in multiple SSDs of the SSD array 110. If one of the SSDs of the SSD array 110 fails, the RAID level of technology that is implemented with the SSD array 110 will allow the data to be recovered. In this way, the DAS system 100 is fully cache coherent. The invention is not limited with respect to the RAID level that is used to ensure cache coherency for data that is cached in the cache memory of the SSD array 110.

Also, the SSD array 110 is typically, but not necessarily, partitioned into respective portions that are used by the respective DAS controllers 120. For example, assuming there are a total of N DAS controllers 120, where N is a positive integer that is equal to or greater than 1, the storage capacity of the SSD array 110 will be divided into N equal portions, with each portion being used by a respective DAS controller 120. Partitioning the SSD array 110 in this manner avoids access conflicts when the DAS controllers 120 access the SSD array 110. However, if one of the DAS controllers 120 fails, one of the other DAS controllers 120 may access the data that is stored in the SSD array 110 and associated with the failed DAS controller 120.

As is known in the art, data has metadata associated with it that defines attributes of the data, such as, for example, the identity of the source of the data (i.e., the hash cache tags), the length of the data stream, and whether or not the data has been modified (i.e., status indication). In DAS systems, the metadata is typically stored in dynamic random access memory (DRAM) inside of the DAS controller. In accordance with one illustrative embodiment of the invention, the metadata is stored in the memory device 140 of the DAS controller 120 while the corresponding data is stored in the cache memory of the SSD array 110 in the manner described above with reference to FIGS. 4-6. This illustrative embodiment for dealing with the metadata will now be described with reference to FIG. 7.

Figure 7:
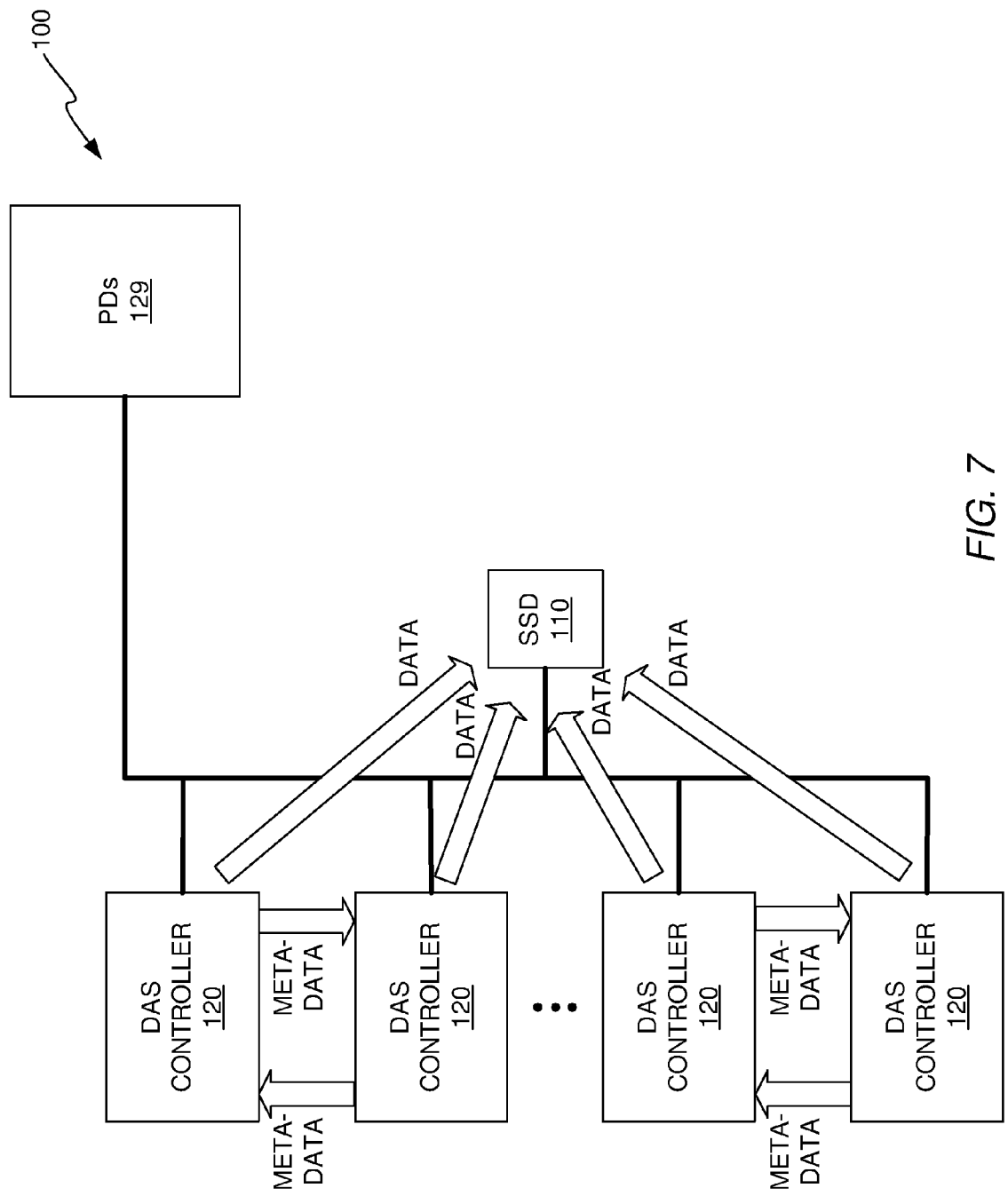
FIG. 7 illustrates a block diagram of the DAS system shown in FIG. 4 in accordance with an illustrative embodiment in which data is cached in the SSD array whereas the associated metadata is cached in cache memory inside of the DAS controllers.

FIG. 7 illustrates a block diagram of the DAS system 100 shown in FIG. 4 in accordance with an illustrative embodiment in which data is cached in the SSD array 110 whereas the associated metadata is cached in cache memory inside of the DAS controllers 120. In accordance with this embodiment, when the CPU 130 of one of the DAS controllers 120 stores data in the cache memory of the SSD array 110, the corresponding metadata is stored in a cache memory portion (not shown) of the memory device 140 of the DAS controller 120 or in some other memory device (not shown) of the DAS controller 120. In addition, to provide cache coherency for the metadata, the metadata that is stored in cache memory in the DAS controller 120 is mirrored in cache memory in one or more of the other DAS controllers 120, as indicated in FIG. 7 by the arrows passing between adjacent DAS controllers 120. In this way, if one of the DAS controllers 120 fails, the corresponding metadata can be recovered from the cache memory of the other DAS controller 120 in which the metadata has been mirrored.

Figure 8:
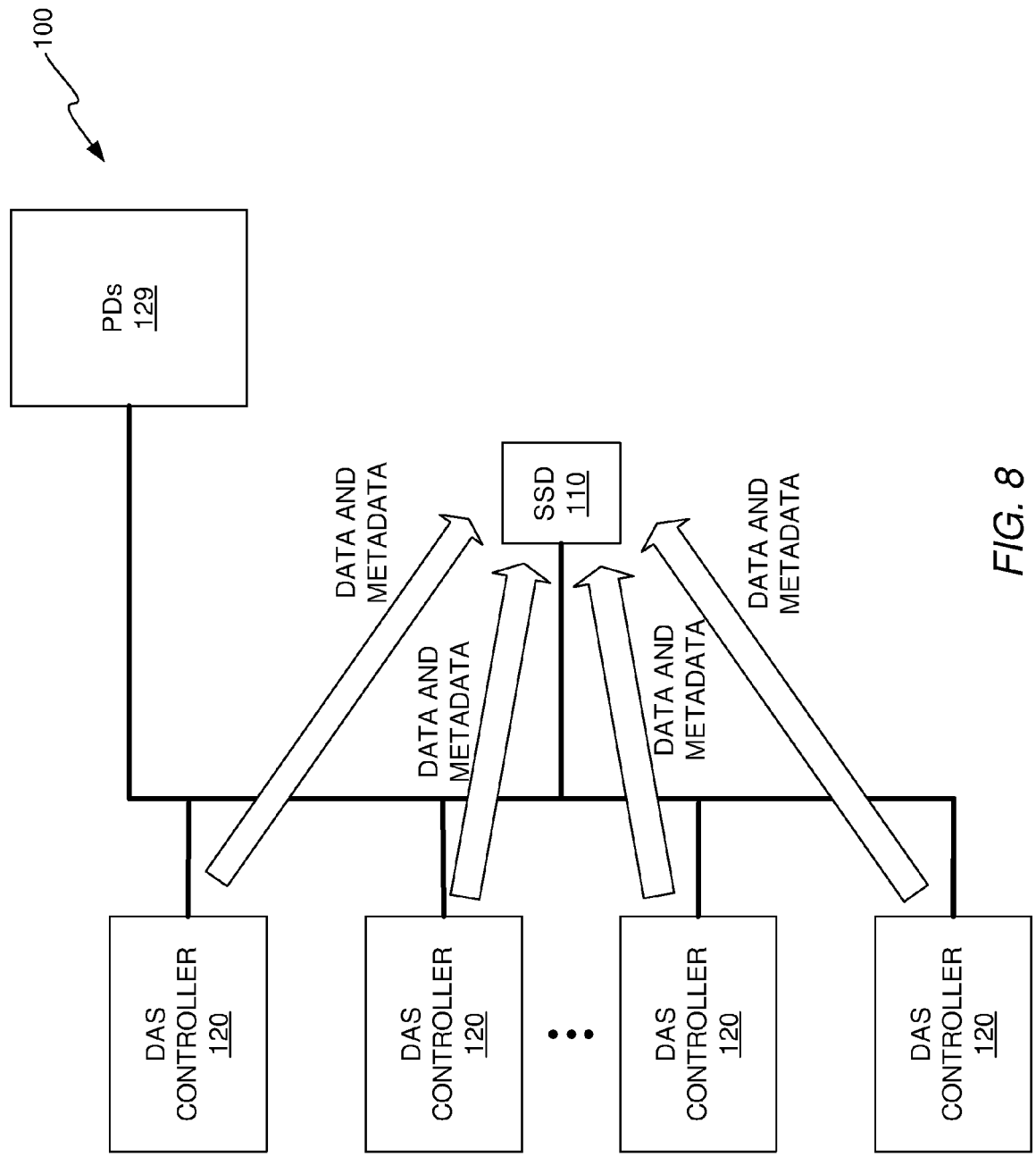
FIG. 8 illustrates a block diagram of the DAS system shown in FIG. 4 in accordance with an illustrative embodiment in which data and associated metadata are cached in the SSD array.

FIG. 8 illustrates a block diagram of the DAS system 100 shown in FIG. 4 in accordance with an illustrative embodiment in which data and associated metadata are cached in the SSD array 110. In SSDs, data is typically written in blocks of a predetermined number of bytes (B), e.g., 520 B per block. The format of the blocks is governed by standard T10 of the InterNational Committee on Information Technology Standards (INCITS). Standard T10 provides that each data block includes a data integrity field (DIF) that includes protection information such as cyclic redundancy check (CRC) bits, application tag bits, and reference tag bits. The DIF as defined by standard T10 is made up of 8 B at the end of each block. Therefore, each block is made up of 512 B of data and 8 B of DIF. In accordance with this illustrative embodiment, the 8 B DIF of each data block is used to represent the metadata associated with the data block. Thus, the data and its associated metadata are stored together in the cache memory of the SSD array 110.

Caching the data and its associated metadata together ensures that, in the event of a power failure during operations, data is updated while its associated metadata is not updated, or vice versa. For example, if the data and metadata are cached independently of one another in different memory devices, a power failure of one memory device may cause the data or metadata stored in the failed memory device to not be updated while the data or metadata stored in the other memory device that did not suffer a power failure is updated. Caching the data and the metadata together in cache memory of the SSD array 110 obviates this problem.

In accordance with this exemplary embodiment, a cache line in the cache memory of the SSD array 110 is made up of 64 KB, where k=1024. Because each block of a given cache line is made up of 512 B of data, each cache line is made up of 128 blocks (i.e., (64 B×1024)/512 B=128). The DIF of each of the 128 blocks of a given cache line is made up of 8 B of metadata. For each cache line, however, only about 64 B of metadata are needed. These 64 B of metadata are divided into 8 B portions. Thus, only the DIFs of 8 blocks that are used for a given cache line are needed for the metadata. In accordance with the illustrative embodiment, the first 8 blocks of each 128-block cache line are allocated for the 8 B of metadata associated with the data contained in the cache line. In order to provide redundancy, the same 8 B of metadata are duplicated in each of the 8 DIFs of the next 8 blocks of the cache line. A hash of the 64 B of metadata is contained in the 8 DIFs of the last 8 blocks of the cache line. This approach ensures atomicity in that the first and last blocks that are written to the cache line are associated with each other by the hash.

Figure 9:
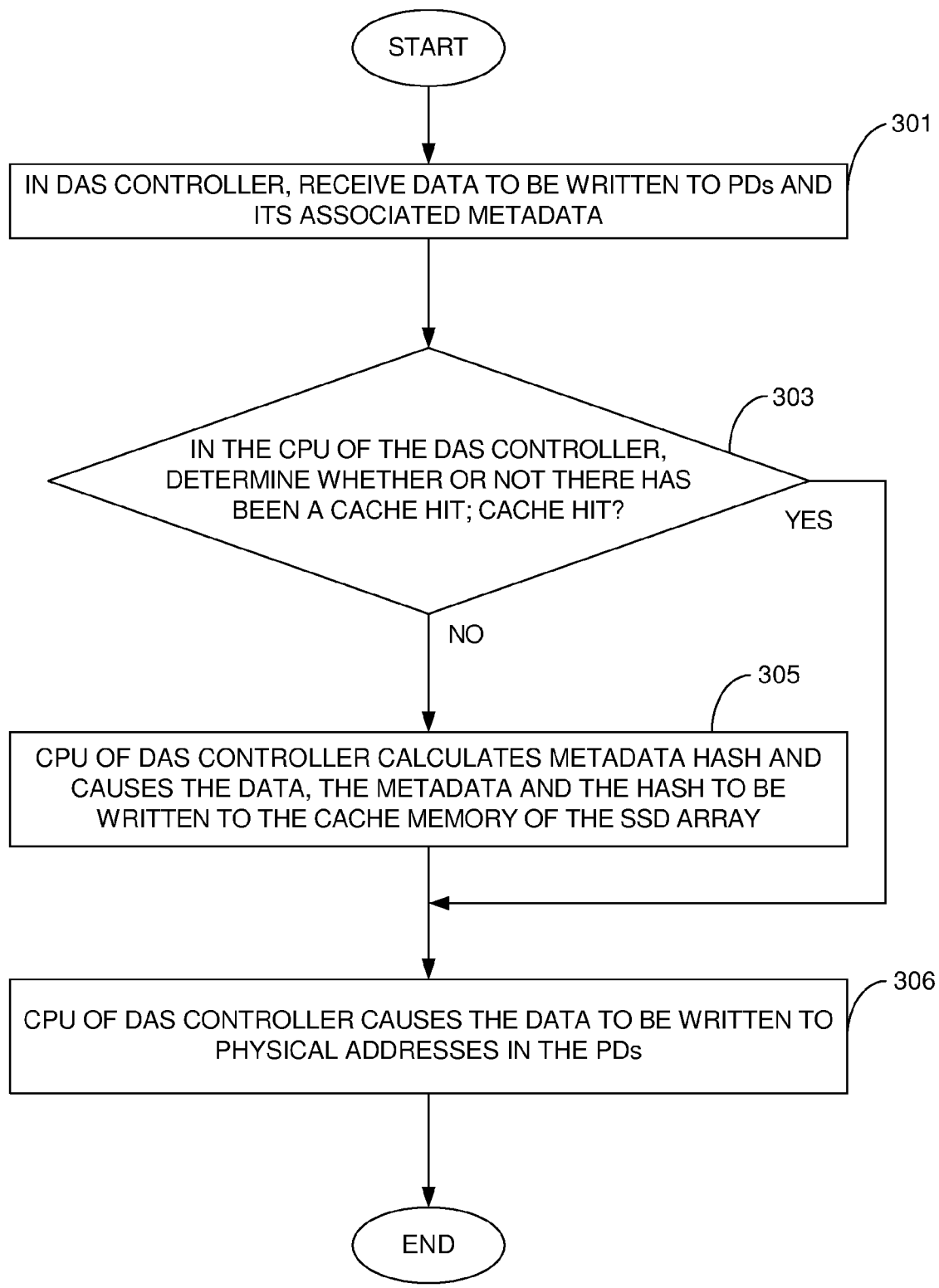
FIG. 9 illustrates a flowchart that represents the WB caching algorithm performed by the DAS controllers shown in FIG. 8.

FIG. 9 illustrates a flowchart that represents the WB caching algorithm performed by the DAS controllers 120 shown in FIG. 8. The algorithm will be described with reference to FIGS. 5, 8 and 9. The CPUs 130 of each of the DAS controllers 120 perform the WB caching algorithm. In the interest of brevity, however, the algorithm will only be described with reference to one of the DAS controllers 120. When a server or workstation (not shown) sends data to the DAS controller 120 to be written to the PDs 129, the DAS controller 120 receives the data and its associated metadata, as indicated by block 301. The CPU 130 then processes the received data to determine whether a cache "hit" or a cache "miss" has occurred, as indicated by block 303.

If the CPU 130 determines that a cache miss has occurred, the CPU 130 calculates the metadata hash and causes the data, the metadata and the metadata hash to be written to the cache memory of the SSD array 110, as indicated by block 305. A variety of known hashing algorithms exist for calculating the metadata hash. Any suitable known hashing algorithm may be used for this purpose. Therefore, in the interest of brevity, the algorithm that is used to calculate the metadata hash will not be described herein.

At some point in time after the data has been written to the cache memory of the SSD array 110, the CPU 130 causes the data and its associated metadata to be stored in physical addresses in the PDs 129, as indicated by block 306. If, at block 303, the CPU 130 determines that a cache hit has occurred, the CPU 130 causes the corresponding data and metadata held in the cache memory of the SSD array 110 to be stored in corresponding physical addresses in the SSD array 110 at the step represented by block 306.

It should be noted that the WB caching algorithm described above with reference to FIGS. 6 and 9 can be implemented in a variety of ways. The WB algorithms are typically performed in the CPUs 130 solely in hardware or in a combination of hardware and software or firmware. Software or firmware instructions that are used for this purpose are stored in a computer-readable medium, such as in the memory devices 140 of the DAS controllers 120, for example.

It will be understood by a person of skill in the art that many variations may be made to the embodiments described above and that all such variations are within the scope of the invention. For example, SSDs are available on the market that do not use DIF. Such SSDs are suitable for use with the invention for caching data, metadata and the metadata hashes. The invention is not limited to using any particular type or configuration of SSDs in the SSD array 110. The invention also is not limited with respect to the configuration of the DAS controller 120. The configuration of the DAS controller 120 shown in FIG. 5 is merely one example of a DAS controller configuration that is suitable for use with the invention.

It should be noted that the invention has been described above with reference to illustrative embodiments for the purposes of demonstrating the principles and concepts of the invention. Persons skilled in the art will understand that many modifications can be made to the embodiments described herein and that all such modifications are within the scope of the invention.

What is claimed is:

1. A direct-attached storage (DAS) system comprising:
   an array of magnetic hard disk drives (HDDs);
   an array of solid state disks (SSDs); and
   at least first and second DAS controllers connected to the array of HDDs and to the SSD array, each DAS controller having a central processing unit (CPU), a local memory device, and an input/output (I/O) interface device, wherein each of the DAS controllers is configured to perform a caching algorithm that causes data received in the respective DAS controller to be temporarily stored in a cache memory of the SSD array and subsequently stored in one or more of the HDDs of the array of HDDs, wherein the data has metadata associated therewith, and wherein the caching algorithms performed by the respective DAS controllers cause the data to be stored in blocks in the SSD array, each block including a data integrity field (DIF), and wherein the respective DAS controllers cause the metadata associated with the data received in the respective DAS controller to be stored in at least one of the DIFs associated with at least one of the blocks in which the associated data is stored in the SSD array.

2. The DAS system of claim 1, wherein the respective DAS controllers are configured to perform a level of Redundant Array of Inexpensive (or Independent) Disks (RAID) technology with respect to the temporary storage of data in the SSD array such that cache coherency is provided for the data that is temporarily stored in the SSD array.

3. The DAS system of claim 1, wherein the caching algorithm performed by each respective DAS controller includes a hashing algorithm that calculates a hash of the metadata, and wherein each respective hash is stored in said at least one of the DIFs associated with at least one of the blocks in which the associated data is stored in the SSD array.

4. The DAS system of claim 1, wherein the metadata associated with the data includes an indication of a source of the data, an indication of a length of the data, and an indication of whether or not the data has been modified.

5. A method for protecting the integrity of cached data in a direct-attached storage (DAS) system, the method comprising:
   in a first DAS controller, receiving data, the first DAS controller including a central processing unit (CPU), a local memory device, and an input/output (I/O) interface device;
   in the first DAS controller, performing a caching algorithm that causes the data received in the first DAS controller to be temporarily stored in blocks in one or more solid state disks (SSDs) of an SSD array and subsequently stored in one or more magnetic hard disk drives (HDDs) of a HDD array, wherein the data has metadata associated therewith, and wherein each block of data temporarily stored by the first DAS controller in one or more SSDs of the SSD array includes a data integrity field (DIF), and wherein the first DAS controller causes the metadata associated with the data received in the first DAS controller to be stored in at least one of the DIFs associated with at least one of the blocks in which the associated data is stored in the SSD array;
   in a second DAS controller, receiving data, the second DAS controller including a CPU, a local memory device, and an I/O interface device; and
   in the second DAS controller, performing a caching algorithm that causes the data received in the second DAS controller to be temporarily stored in blocks in one or more SSDs of the SSD array and subsequently stored in one or more of the magnetic HDDs of the HDD array, wherein the data received in the second DAS controller has metadata associated therewith, and wherein each block of data temporarily stored by the second DAS controller in one or more SSDs of the SSD array includes a DIF, and wherein the second DAS controller causes the metadata associated with the data received in the second DAS controller to be stored in at least one of the DIFs associated with at least one of the blocks in which the associated data is stored in the SSD array.

6. The method of claim 5, wherein the respective DAS controllers are configured to perform a level of Redundant Array of Inexpensive (or Independent) Disks (RAID) technology with respect to the temporary storage of data in the SSD array such that cache coherency is provided for the data that is temporarily stored in the SSD array.

7. The method of claim 5, wherein the caching algorithm performed by each respective DAS controller includes a hashing algorithm that calculates a hash of the metadata, and wherein each respective hash is stored in said at least one of the DIFs associated with at least one of the blocks in which the associated data is stored in the SSD array.

8. The method of claim 5, wherein the metadata associated with the data includes an indication of a source of the data, an indication of a length of the data, and an indication of whether or not the data has been modified.

9. A computer-readable medium having a computer program stored thereon for protecting the integrity of cached data in a direct-attached storage (DAS) system, the computer program comprising computer instructions stored on the computer-readable medium, the instructions comprising:

a first set of instructions for receiving data in a first DAS controller; and a second set of instructions for performing a caching algorithm in the first DAS controller that causes the data received in the first DAS controller to be temporarily stored in blocks in one or more solid state disks (SSDs) of an SSD array and subsequently stored in one or more magnetic hard disk drives (HDDs) of an array of HDDs, wherein each block includes a data integrity field (DIF), and wherein the data has metadata associated therewith, and wherein the caching algorithm causes the metadata associated with the data received in the DAS controller to be stored in at least one of the DIFs associated with at least one of the blocks in which the associated data is stored in the SSD array.

10. The computer-readable medium of claim 9, wherein the DAS controller is configured to perform a level of Redundant Array of Inexpensive (or Independent) Disks (RAID) technology with respect to the temporary storage of data in the SSD array such that cache coherency is provided for the data that is temporarily stored in the SSD array.

11. The computer-readable medium of claim 9, wherein the caching algorithm performed by the DAS controller includes a hashing algorithm that calculates a hash of the metadata, and wherein each respective hash is stored in said at least one of the DIFs associated with at least one of the blocks in which the associated data is stored in the SSD array.

12. The computer-readable medium of claim 9, wherein the metadata associated with the data includes an indication of a source of the data, an indication of a length of the data, and an indication of whether or not the data has been modified.

13. A direct-attached storage (DAS) system comprising:
an array of magnetic hard disk drives (HDDs);
an array of solid state disks (SSDs); and
at least first and second DAS controllers connected to the array of HDDs and to the SSD array, each DAS controller having a central processing unit (CPU), a local memory device, and an input/output (I/O) interface device, wherein each of the DAS controllers perform a caching algorithm that causes data received in the respective DAS controller to be temporarily stored in a cache memory of the SSD array and subsequently stored in one or more of the HDDs of the HDD array, wherein the respective DAS controllers are configured to perform a level of Redundant Array of Inexpensive (or Independent) Disks (RAID) technology with respect to the temporary storage of data in the SSD array such that cache coherency is provided for the data that is temporarily stored in the SSD array.

14. The DAS system of claim 13, wherein the data has metadata associated therewith, and wherein each of the local memory devices of the DAS controllers has a portion thereof that is used as cache memory, and wherein the WB caching algorithms performed by the respective DAS controllers cause the metadata associated with the data received in the respective DAS controller to be temporarily stored in the respective cache memory portion of the respective local memory device and subsequently stored in one or more of the HDDs of the array of HDDs.

15. A method for protecting the integrity of cached data in a direct-attached storage (DAS) system, the method comprising:

in a first DAS controller, receiving data, the first DAS controller including a central processing unit (CPU), a local memory device, and an input/output (I/O) interface device; and in the first DAS controller, performing a caching algorithm that causes the data received in the first DAS controller to be temporarily stored in one or more solid state disks (SSDs) of an SSD array and subsequently stored in one or more magnetic hard disk drives (HDDs) of an HDD array, wherein the DAS controller is configured to perform a level of Redundant Array of Inexpensive (or Independent) Disks (RAID) technology with respect to the temporary storage of data in the SSD array such that cache coherency is provided for the data that is temporarily stored in the SSD array.

16. The method of claim 15, wherein the data has metadata associated therewith, and wherein the local memory device of the DAS controller has a portion thereof that is used as cache memory, and wherein the WB caching algorithm performed by the DAS controller causes the metadata associated with the data received in the DAS controller to be temporarily stored in the cache memory portion of the local memory device and subsequently stored in one or more of the HDDs of the HDD array.

* * * * *